United States Patent
Araki

(10) Patent No.: US 9,337,504 B2
(45) Date of Patent: May 10, 2016

(54) FUEL CELL SYSTEM AND FUEL CELL STATUS DETECTION METHOD

(75) Inventor: Yasushi Araki, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 257 days.

(21) Appl. No.: 13/059,752

(22) PCT Filed: Aug. 19, 2009

(86) PCT No.: PCT/IB2009/006584
§ 371 (c)(1),
(2), (4) Date: Feb. 18, 2011

(87) PCT Pub. No.: WO2010/020861
PCT Pub. Date: Feb. 25, 2010

(65) Prior Publication Data
US 2011/0151347 A1    Jun. 23, 2011

(30) Foreign Application Priority Data

Aug. 20, 2008  (JP) ................................ 2008-212250

(51) Int. Cl.
H01M 8/04      (2006.01)

(52) U.S. Cl.
CPC ...... *H01M 8/04992* (2013.01); *H01M 8/04552* (2013.01); *H01M 8/04582* (2013.01); *H01M 8/04358* (2013.01); *H01M 8/04671* (2013.01); Y02E 60/50 (2013.01)

(58) Field of Classification Search
CPC ............... H01M 8/04619; H01M 8/04679; H01M 8/1004; H01M 8/1002; H01M 8/04559; H01M 8/04582; H01M 8/04671; H01M 8/04902; H01M 8/0494; H01M 8/04522; H01M 8/04992; H01M 8/04358; G01R 31/3658; Y02E 60/50
USPC ................ 702/63, 57, 64, 65, 108, 113, 127; 429/22, 23, 25, 431, 432; 700/287; 324/433, 434
See application file for complete search history.

(56) References Cited

U.S. PATENT DOCUMENTS

| | | | |
|---|---|---|---|
| 4,424,491 A | 1/1984 | Bobbett et al. | |
| 4,904,548 A * | 2/1990 | Tajima | 429/431 |

(Continued)

FOREIGN PATENT DOCUMENTS

| | | |
|---|---|---|
| CN | 1793882 A | 6/2006 |
| DE | 29912681 U1 | 11/1999 |

(Continued)

OTHER PUBLICATIONS

Pukrushpan, Jay Tawee., Modeling and Control of Fuel Cell Systems and Fuel Procesors., Department of Mechanical Engineering, The University of Michigan, 2003.*

(Continued)

*Primary Examiner* — Mischita Henson
*Assistant Examiner* — Yoshihisa Ishizuka
(74) *Attorney, Agent, or Firm* — Sughrue Mion, PLLC

(57) ABSTRACT

A fuel cell system (100) is provided with a voltage detection device (41) that detects a cell voltage of a cell group containing one or more cells (11), a current density detection device (42) that detects a generated current density of the cell group, and a determination portion (52) that determines the presence or absence of an inflection point of a change in the cell voltage relative to the generated current density based on the detection results of the voltage detection device and the current density detection device.

11 Claims, 12 Drawing Sheets

(56) References Cited

U.S. PATENT DOCUMENTS

| | | | |
|---|---|---|---|
| 5,170,124 A * | 12/1992 | Blair et al. ............... 324/434 |
| 6,441,624 B1 | 8/2002 | Bronold et al. |
| 7,259,808 B2 | 8/2007 | Kim et al. |
| 7,359,808 B2 * | 4/2008 | Okuda ....................... 702/63 |
| 2002/0102447 A1 * | 8/2002 | Kato ........................... 429/23 |
| 2003/0141188 A1 * | 7/2003 | Imamura et al. ........ 204/424 |
| 2004/0157110 A1 * | 8/2004 | Knights et al. ............ 429/44 |
| 2005/0096858 A1 * | 5/2005 | Okuda ....................... 702/63 |

FOREIGN PATENT DOCUMENTS

| | | | | |
|---|---|---|---|---|
| DE | 102009026917 A1 | | 12/2010 | |
| EP | 827226 A2 | * | 3/1998 | ......... H01M 8/04 |
| EP | 862233 A2 | * | 9/1998 | ......... H01M 8/04 |
| JP | 2000-261901 A | | 9/2000 | |
| JP | 2002-520778 A | | 7/2002 | |
| JP | 2002-358993 A | | 12/2002 | |
| JP | 3429478 B2 | | 5/2003 | |
| JP | 2005-142062 A | | 6/2005 | |
| JP | 2006-155965 A | | 6/2006 | |
| JP | 2006-179338 A | | 7/2006 | |
| JP | 2006-244758 A | | 9/2006 | |

OTHER PUBLICATIONS

Chinese Office Action for corresponding CN Patent Application No. 200980132419.X issued on Dec. 11, 2012.

International Search Report and Written Opinion for corresponding International Patent Application No. PCT/IB2009/006584 mailed Nov. 5, 2009.

* cited by examiner $2H_2 \rightarrow 4H^+ + 4e^-$    $O_2 + 4H^+ + 4e^- \rightarrow 2H_2O$ $H_2 \rightarrow 2H^+ + 2e^-$    $2H^+ + 2e^- \rightarrow H_2$

FUEL CELL SYSTEM AND FUEL CELL STATUS DETECTION METHOD

BACKGROUND OF THE INVENTION

1. Field of the Invention

The invention relates to a fuel cell system and a method for detecting the status of a fuel cell.

2. Description of the Related Art

Fuel cells are devices for obtaining electrical energy typically by using hydrogen and oxygen as fuel. Since these fuel cells are superior in terms of the environment and are able to realize high energy efficiency, their development is proceeding in a wide range of fields for use as an energy supply system of the future. In particular, since polymer electrolyte fuel cells operate at a comparatively low temperature among the various types of fuel cells, they have good startability. Consequently, research on these fuel cells is proceeding actively for applications in numerous fields.

In a polymer electrolyte fuel cell, a membrane electrode assembly (MEA) is interposed between separators. In the MEA, an anode is provided on one side of an electrolyte membrane composed of a solid polymer electrolyte having proton conductivity, and a cathode is provided on the other side of the electrolyte membrane.

The status of a fuel cell changes according to operating conditions and the like. Therefore, technologies have been developed for monitoring decreases in cell voltage measured for each cell group in fuel cell stacks consisting of a plurality of laminated fuel cells. (see, for example, Japanese Patent Application Publication No. 2006-179338 (JP-A-2006-179338)).

However, it is difficult to accurately detect the status of a cell by simply monitoring decreases in voltage. In addition, although decreases in cell voltage can also be monitored for cell groups, it is difficult to accurately detect the status of a cell contained in the cell group. On the other hand, providing means for detecting cell voltage for each cell ends up increasing costs.

SUMMARY OF THE INVENTION

An object of the invention is to provide a fuel cell system and fuel cell status detection method enabling the status of a fuel cell to be detected accurately while suppressing increases in costs.

In a first aspect thereof, the invention relates to a fuel cell system provided with voltage detection means for detecting a cell voltage of a cell group containing one or more cells, current density detection means for detecting a generated current density of the cell group, and determination means for determining the presence or absence of an inflection point of a change in the cell voltage relative to the generated current density based on the detection results of the voltage detection means and the current density detection means. In this fuel cell system, the inflection point can be detected for a target cell group. Consequently, the status of a fuel cell can be detected with high accuracy. In addition, since the inflection point can be detected even if a plurality of cells are contained in the cell group, it is not necessary to provide voltage detection means for each cell. As a result, costs can be reduced. Furthermore, as a result of analyzes by the inventors, it was found that in the state in which a voltage drop is constant, the electromotive force of a concentration cell is based on the difference in hydrogen concentration between the anode and cathode caused by leakage of hydrogen from the anode to the cathode or by an oxygen deficiency at the cathode.

The determination means may also determine the presence or absence of the inflection point based on the difference between a primary regression voltage of the cell voltage of the cell group and the voltage detected by the voltage detection means under prescribed conditions. The determination means may also determine the presence or absence of the inflection point in the cell group using the relationship between the cell voltage of the cell group and a standard voltage of a standard cell group containing one or more cells. The determination means may also determine the inflection point to be present in the case the slope of the cell voltage of the cell group relative to the current density has become larger than the slope of the standard voltage of the standard cell group relative to the current density by a prescribed amount.

The determination means may also determine the presence or absence of the inflection point in a rate of divergence between the cell voltage of the cell group and the standard voltage of the standard cell group at the same current density. In this case, the presence or absence of the inflection point can be determined with greater accuracy.

The determination means may also determine the infection point to be present in the case the slope of the rate of divergence relative to the current density is negative. The determination means may also determine the inflection point to be present in the case an intercept of a linear regression line relative to the current density of the rate of divergence is equal to or greater than a prescribed value.

The standard cell group may have higher power generation performance than the average power generation performance in the fuel cell stack. The standard cell group may also have higher power generation durability than the average power generation durability in the fuel cell stack. In these cases, an inflection point can be detected with greater accuracy.

In a second aspect thereof, the invention relates to a method for detecting the status of a fuel cell having a voltage detection step of detecting a cell voltage of a cell group containing one or more cells, a current density detection step of detecting a generated current density of the cell group, and a determination step of determining the presence or absence of an inflection point of a change in the cell voltage relative to the generated current density based on the detection results in the voltage detection step and the current density detection step. In this method for detecting the status of a fuel cell, the inflection point can be detected for a target cell group. Consequently, the status of a fuel cell can be detected with high accuracy. In addition, since the inflection point can be detected even if a plurality of cells are contained in the cell group, it is not necessary to provide voltage detection means for each cell. As a result, costs can be reduced.

In the determination step, the presence or absence of the inflection point may also be determined based on the difference between a primary regression voltage of the cell voltage of the cell group and the voltage detected in the voltage detection step under prescribed conditions. In the determination step, the presence or absence of the inflection point may also be determined in the tell group using the relationship between the cell voltage of the cell group and a standard voltage of a standard cell group containing one or more cells. In the determination step, the inflection point may also be determined to be present in the case the slope of the cell voltage of the cell group relative to the current density has become larger than the slope of the standard voltage of the standard cell group relative to the current density by a prescribed amount.

In the determination step, the presence or absence of the inflection point may also be determined in a rate of divergence between the cell voltage of the cell group and the standard voltage of the standard cell group at the same current density. In this case, the presence or absence of the inflection point can be determined with greater accuracy.

In the determination step, the infection point may also be determined to be present in the case the slope of the rate of divergence relative to the current density is negative. In the determination step, the inflection point may also be determined to be present in the case the intercept of a linear regression line relative to the current density of the rate of divergence is equal to or greater than a prescribed value.

The standard cell group may have higher power generation performance than the average power generation performance in the fuel cell stack. The standard cell group may also have higher power generation durability than the average power generation durability in the fuel cell stack. In these cases, an inflection point can be detected with greater accuracy.

A third aspect of the invention relates to a fuel cell system including a voltage detection device that detects a cell voltage of a cell group containing one or more cells; a current density detection device that detects a generated current density of the cell group; and a determination portion that determines the presence or absence of an inflection point of a change in the cell voltage relative to the generated current density based on the detection results of the voltage detection means and the current density detection means.

According to the invention, the status of a fuel cell can be detected with high accuracy.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

First Embodiment

Figure 1A:
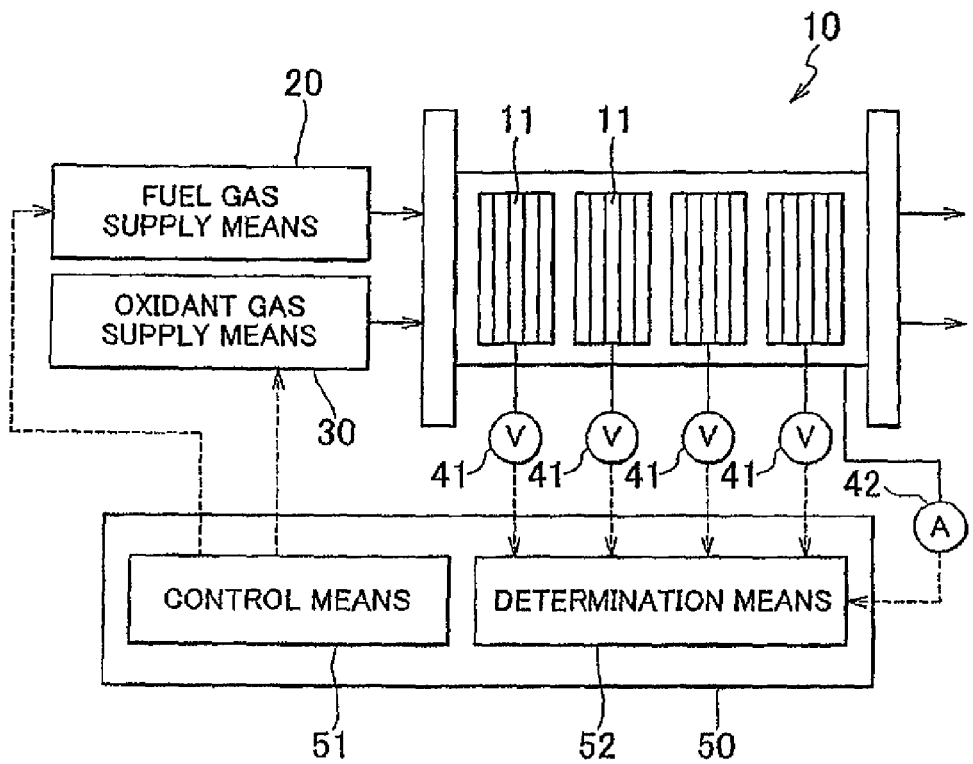
FIGS. 1A and 1B are drawings for explaining the fuel cell system of a first embodiment of the invention.
Figure 1B:
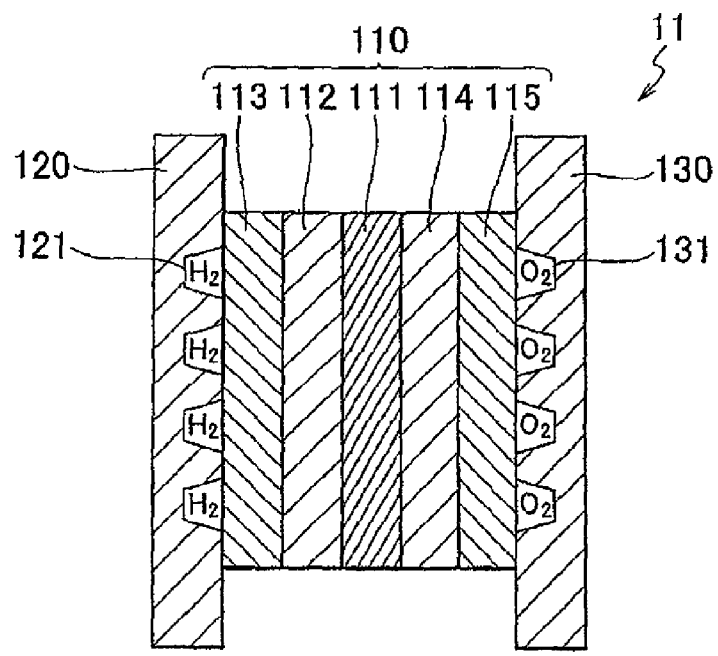

FIG. 1 is a drawing for explaining a fuel cell system 100 of a first embodiment of the invention. FIG. 1A is a schematic diagram showing the overall configuration of the fuel cell system 100. FIG. 1B is a schematic cross-sectional view of a cell 11 to be subsequently described. As shown in FIG. 1A, the fuel cell system 100 is provided with a fuel cell stack 10, fuel gas supply means 20, oxidant gas supply means 30, voltage detection means 41, current detection means 42 and a processing unit 50.

The fuel cell stack 10 has a structure in which one or a plurality of cell groups are laminated, and one or a plurality of cells 11 are laminated in each cell group. As shown in FIG. 1B, the cells 11 have a structure in which a membrane electrode assembly 110 is interposed between a separator 120 and a separator 130. In the membrane electrode assembly 110, an anode catalyst layer 112 and a gas diffusion layer 113 are bonded to an electrolyte membrane 111 in that order on the side of the separator 120, while a cathode catalyst layer 114 and a gas diffusion layer 115 are bonded to the electrolyte membrane 111 in that order on the side of the separator 130, The electrolyte membrane 111 is composed of a solid polymer electrolyte such as a perfluorosulfonic acid polymer, having proton conductivity.

The anode catalyst layer 112 is composed of a conductive material that supports a catalyst and a proton-condueting celectrolyte. The catalyst in the anode catalyst layer 112 is a catalyst for promoting protonation of hydrogen. For example, the anode catalyst layer 112 contains platinum-supported carbon or perfluorosulfonic acid polymer. The gas diffusion layer 113 is composed of a conductive material having gas permeability such as carbon paper or carbon cloth.

The cathode catalyst layer 114 is composed of a conductive material that supports a catalyst and a proton-conducting electrolyte. The cathode catalyst layer 114 is catalyst for promoting the reaction between protons and hydrogen. For example, the cathode catalyst layer 114 contains platinum-supported carbon or perfluorosulfonic acid polymer. The gas diffusion layer 115 is composed of a conductive material having gas permeability such as carbon paper or carbon cloth.

The separators 120 and 130 are composed of a conductive material such as stainless steel. Fuel gas flow paths 121 for allowing the flow of fuel gas are provided in the separator 120 on the side of the membrane electrode assembly 110. Oxidant gas flow paths 131 for allowing the flow of oxidant gas are provided in the separator 130 on the side of the membrane electrode assembly 110. For example, the fuel gas flow paths 121 and the oxidant gas flow paths 131 are composed of indentations formed in the surface of the separators.

The fuel gas supply means 20 is a device for supplying fuel gas containing hydrogen to the fuel gas flow paths 121 via a fuel gas inlet of the fuel cell stack 10. The fuel gas supply means 20 is composed of, for example, a hydrogen gas cylinder or reformer. The oxidant gas supply means 30 is a device for supplying oxidant gas containing oxygen to the oxidant gas flow paths 131 via an oxidant gas inlet of the fuel cell stack 10. The oxidant gas supply means 30 is composed of, for example, an air pump.

The voltage detection means 41 detects the cell voltage of each cell group and outputs the detection results to control means 51 to be subsequently described. The current detection means 42 detects the generated current of the fuel cell stack 10 and outputs the detection results to the control means 51. A generated current density is obtained by dividing a detection result of the current detection means 42 by the surface area of the power generation region of each cell 11. Thus, the current detection means 42 also functions as generated current density detection means.

The processing unit 50 contains control means 51 and determination means 32. The processing unit 50 is composed of a central processing unit (CPU), read only memory (ROM), random access memory (RAM) and the like. The CPU of the processing unit 50 executes a prescribed program to realize the control means 51 and the determination means 52. The control means 51 controls each component of the fuel cell system 100. The determination means 52 determines the status of the fuel cell stack 10 based on detection results of the voltage detection means 41 and the current detection means 42.

Figure 2:
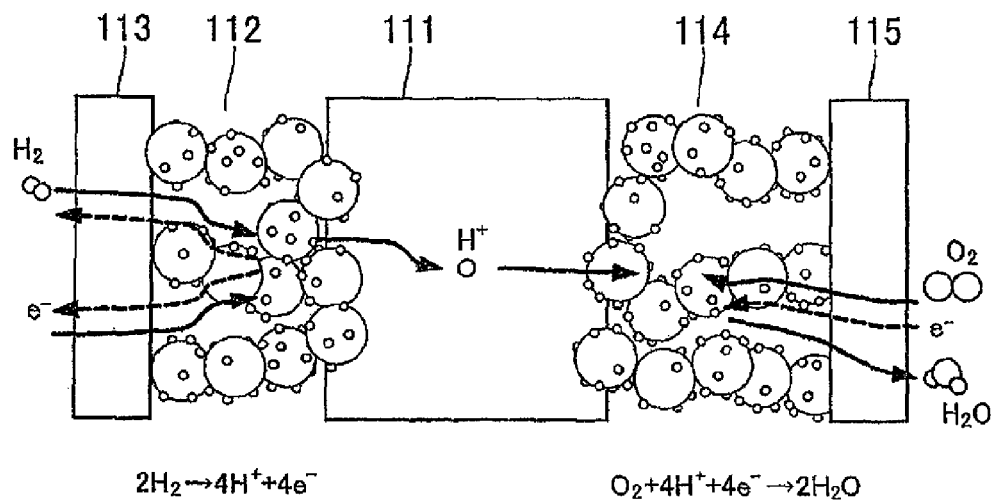
FIG. 2 is a schematic diagram for explaining a power generation reaction in a cell.

Continuing, an explanation is provided of the operation of the fuel cell system 100 during ordinary power generation with reference to FIGS. 1A, 1B and 2. FIG. 2 is a schematic diagram for explaining a power generation reaction in the cells 11. First, the control means 51 controls the fuel gas supply means 20 so that fuel gas is supplied to the fuel gas flow paths 121. This fuel gas reaches the anode catalyst layer 112 by permeating through the gas diffusion layer 113. Hydrogen contained in the fuel gas dissociates into protons and electrons by means of the catalyst of the anode catalyst layer 112. Protons then reach the cathode catalyst layer 114 by being conducted by the electrolyte membrane 111.

In addition, the control means 51 controls the oxidant gas supply means 30 so that oxidant gas is supplied to the oxidant gas flow paths 131. This oxidant gas reaches the cathode catalyst layer 114 by permeating through the gas diffusion layer 115. Protons and oxygen react in the cathode catalyst layer 114 by means of a catalyst. As a result, electrical power is generated and water is formed. The formed water is discharged through the oxidant gas flow paths 131.

Figure 3:
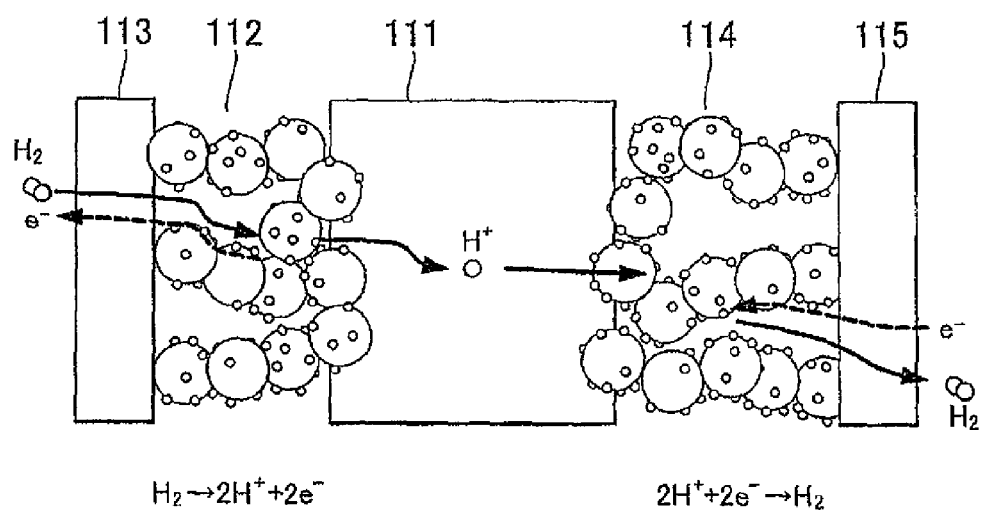
FIG. 3 is a schematic diagram for explaining an oxygen depletion reaction in a cell.

If oxygen is depleted on the cathode side, the water formation reaction in the cathode catalyst layer 114 is inhibited. In this case, as shown in FIG. 3, hydrogen is protonated in the anode catalyst layer 112 and two protons bond to form hydrogen in the cathode catalyst layer 114. Thus, a hydrogen concentration cell is formed. In this case, cell, voltage fluctuates as compared with the case of FIG. 2.

Figure 4:
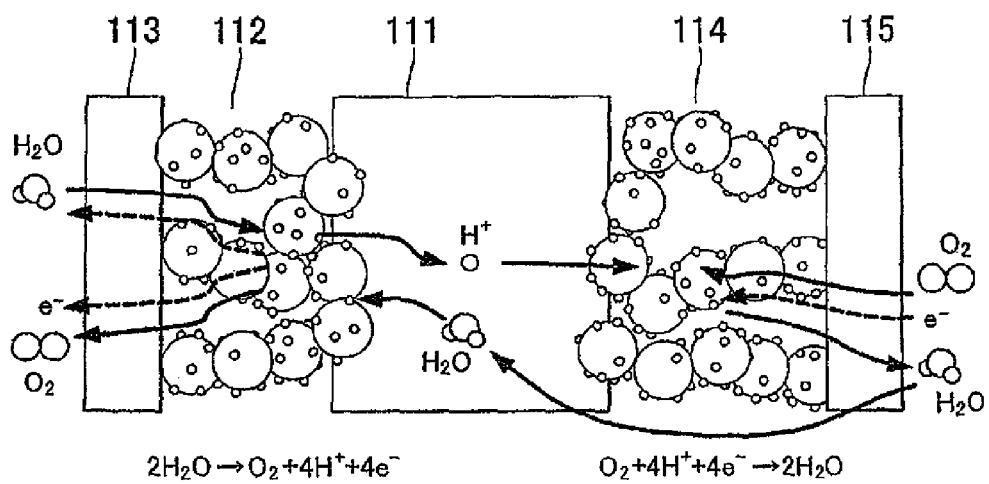
FIG. 4 is a schematic diagram for explaining a hydrogen depletion reaction in a cell.

If hydrogen is depleted on the anode side, protonation of hydrogen is inhibited. In this case, as shown in FIG. 4, an electrolytic reaction of water and the like occurs in the anode catalyst layer 112, In this case, cell voltage fluctuates as compared with the case of FIG. 2. Cell abnormalities attributable to oxygen depletion or hydrogen depletion can be detected by detecting these fluctuations in cell voltage.

Figure 5:
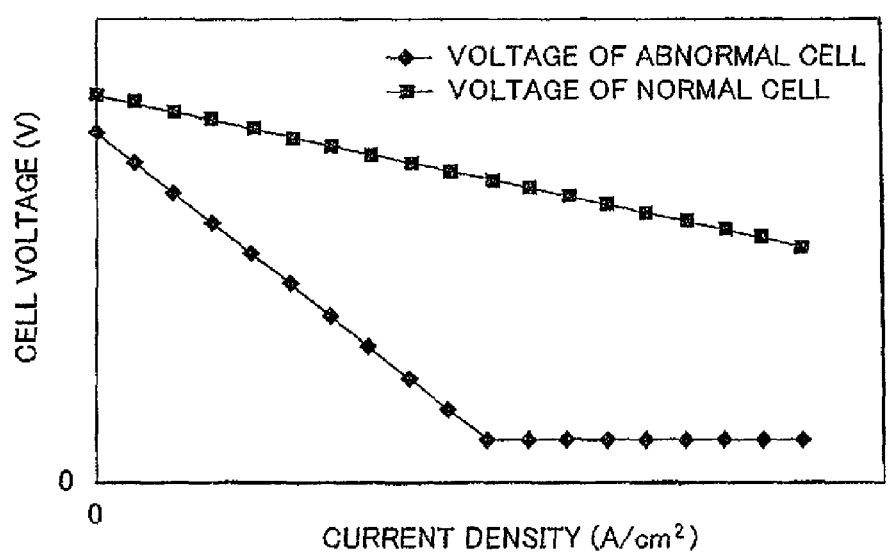
FIG. 5 is a graph showing the relationship between current density and cell voltage.

In this embodiment, cell abnormalities attributable to oxygen depletion or hydrogen depletion are detected according to whether or not an inflection point appears in the change in cell voltage relative to an increase or decrease in generated current density. FIG. 5 is a graph showing the relationship between current density and cell voltage. In FIG. 5, current density is plotted on the horizontal axis and cell voltage is plotted on the vertical axis. As shown in FIG. 5, in a normal cell, cell voltage tends to decrease linearly relative to an increase in current density. In contrast, in a cell in which a problem such as hydrogen depletion has occurred, the amount of the decrease in cell voltage relative to an increase in current density is larger, and the amount of the decrease in cell voltage then becomes smaller once the current density has exceeded a prescribed current density.

The point at which the slope of cell voltage relative to the current density changes in this manner is an inflection point. If this inflection point was detected, it would be possible to determine the occurrence of a problem such as oxygen depletion or hydrogen depletion in any of the cells of a cell group. The following provides a detailed explanation of the detection of an inflection point.

Figure 6A:
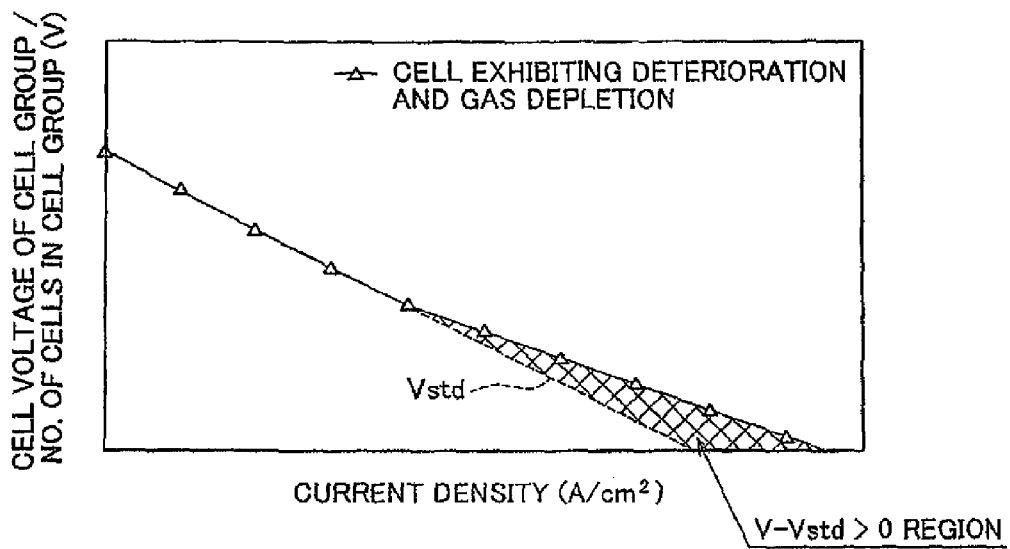
FIGS. 6A and 6B are graphs for explaining detection of an inflection point using a standard voltage.
Figure 6B:
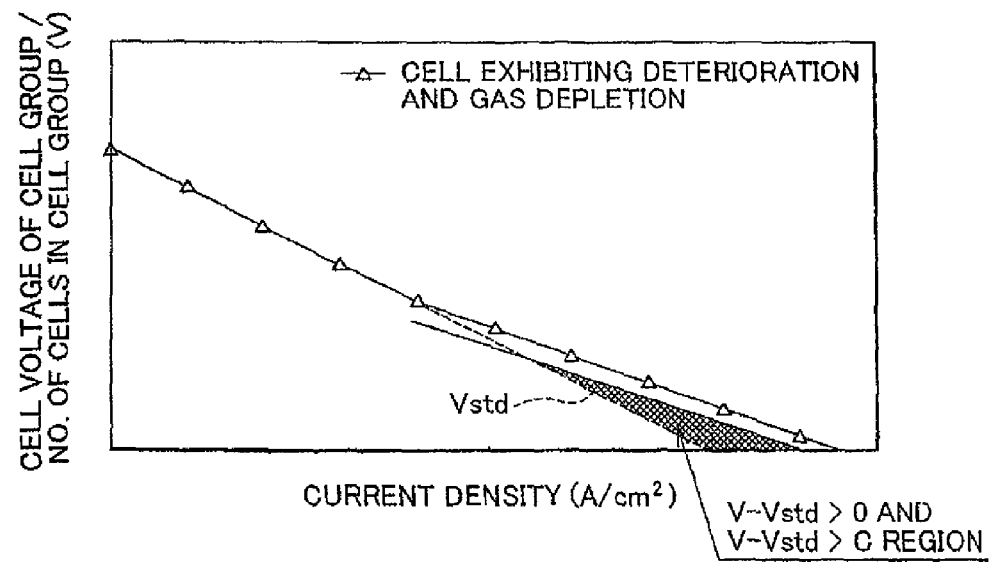

FIGS. 6A and 6B are graphs for explaining detection of an inflection point using a standard voltage. In FIGS. 6A and 6B, current density is plotted on the horizontal axis, while the voltage per cell of each cell group is plotted on the vertical axis. In FIG. 6A, an inflection point is detected based on the difference between a standard voltage $V_{std}$ and a measured voltage V.

The standard voltage $V_{std}$ refers to a standard voltage obtained on the premise that the cell voltage in each cell group does not fluctuate. For example, the standard voltage $V_{std}$ is a value calculated by primary regression. This value may be calculated during the course of the rise in current density when the fuel cell stack 10 is started, for example, or may be measured in advance. However, a cell voltage may not changing linearly relative to the current density near the upper limit and lower limit of current density. Thus, this value may be calculated by primary regression while excluding a prescribed amount each of the upper and lower ends (for example, about 5% each) of the range of current density able to be output by the cells 11. As a result, the accuracy of the primary regression can be improved.

The following provides an explanation of an example of calculating the standard voltage $V_{std}$. First, the sum of squared deviation ($\Sigma(I_i-I_{ave})^2$) of current density is determined within a current density range equal to or less than a prescribed value. Here, indicates a current density while $I_{ave}$ indicates the average current density within the above-mentioned current density range. Next, the sum of products of the difference of the current density and the average current density and the difference of voltage per cell and average voltage per cell ($\Sigma(I_i-I_{ave})(V_i-V_{ave})$) is determined. Here, Vi indicates a voltage per cell, while $V_{ave}$ indicates the average voltage within the above-mentioned current density range. Next, a regression coefficient b is determined using the following formula (1), and a regression equation intercept a is determined using the following formula (2). As a result, the standard voltage $V_{std}$ is calculated as shown in the following formula (3).

$$b=(\Sigma(I_i-I_{ave})(V_i-V_{ave}))/(\Sigma(I_i-I_{ave})^2) \quad (1)$$

$$a=V_{ave}-b\times I_{ave} \quad (2)$$

$$V_{std}=a+b\times I \quad (3)$$

As shown in FIG. 6A, on the side of high current density beyond the infection point, the measured voltage V per cell of a target cell group—standard voltage $V_{std}$>0. Thus, the point at which the difference of measured voltage V—standard voltage $V_{std}$ becomes positive can be detected as the inflection point. An offset may be set to avoid measurement error, unexpected environmental changes and the like. For example, as shown in FIG. 6B, the point at which measured voltage V—standard voltage V>0 and measured voltage V—standard voltage $V_{std}$>C (where C is a prescribed offset value) can be detected as the inflection point.

Figure 7:
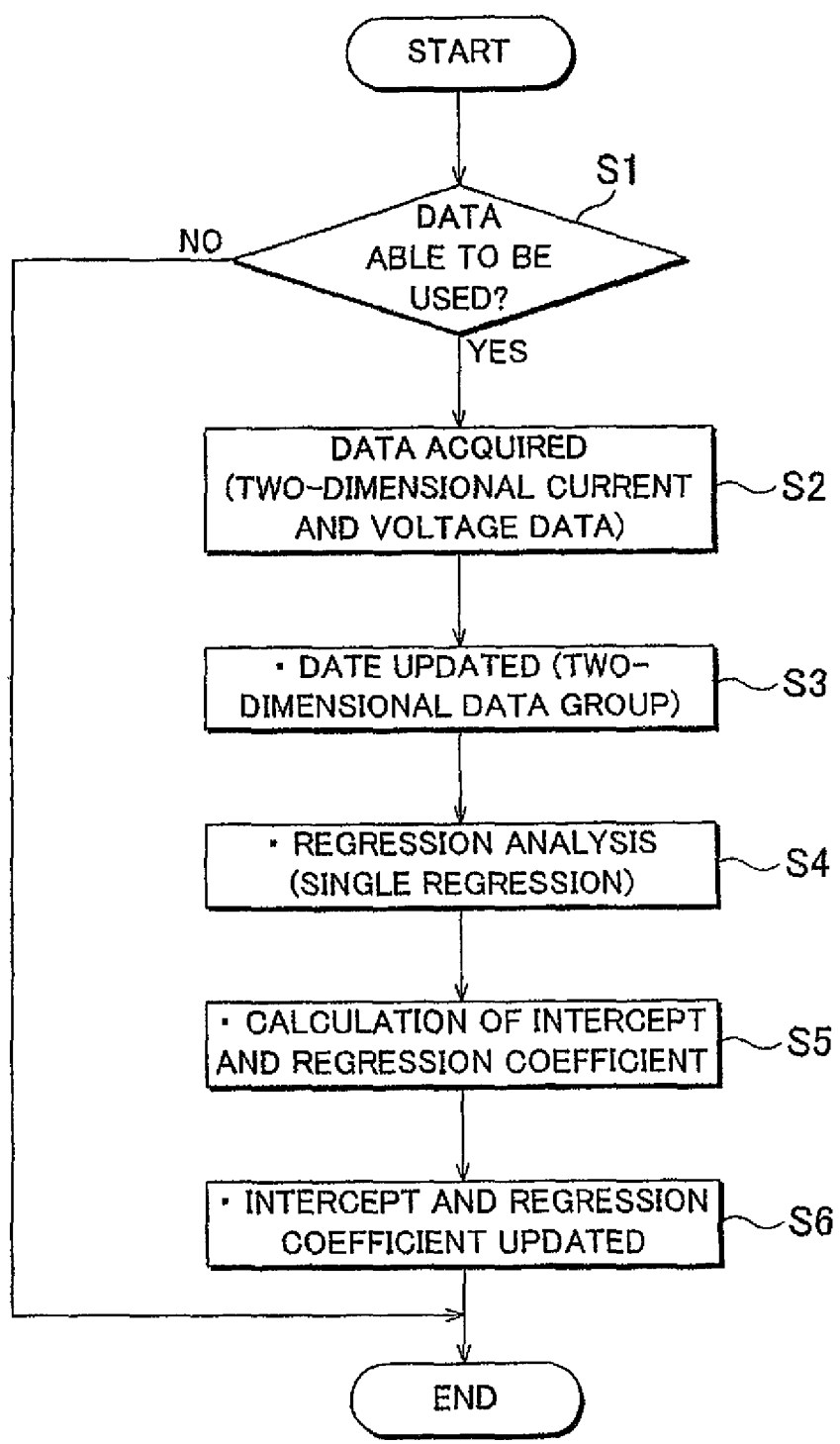
FIG. 7 is a drawing showing an example of a flow chart for calculating a standard voltage.

The following provides an explanation of the flow for detection of an inflection point. FIG. 7 is a drawing showing an example of a flow chart for calculating the standard voltage $V_{std}$. The flow chart of FIG. 7 is executed by the control means 51 at a prescribed cycle. As shown in FIG. 7, the control means 51 first determines whether or not data can be used (Step S1). The flow chart shown in FIG. 8 to be subsequently described can be used as a judgment criterion in this case.

In the case data has not been determined to be able to be used in Step S1, the control means 51 ends execution of the flow chart. In the case the data has been determined to be able to be used in Step S1, the control means 51 acquires a generated voltage of each cell group from the voltage detection means 41 while also acquiring a generated current from the current detection means 42 (Step S2). Next, the control means 51 updates the generated current data and generated voltage data to the values acquired in Step S2 (Step S3).

Next, the control means 51 carries out regression analysis (single regression) on each cell group using the updated data (Step S4). Next, the control means 51 calculates the intercept a and the regression coefficient b (Step S5). Next, the control means 51 updates the intercept a and the regression coefficient b to the values calculated in Step S5 (Step S6). Subsequently, the control means 51 ends execution of the flow chart. A standard voltage $V_{ad}$ can be calculated for each cell group by executing this flow chart.

Figure 8:
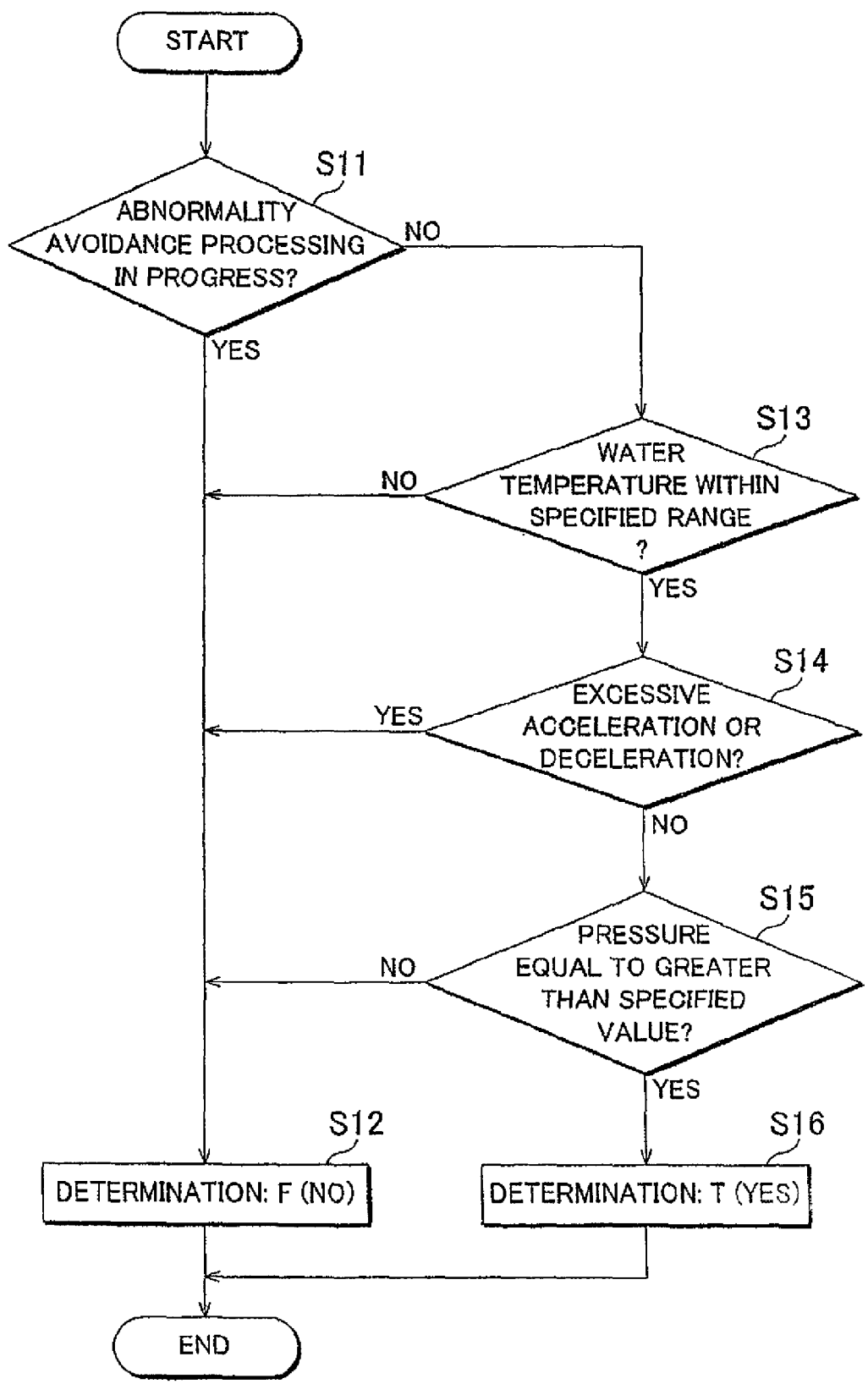
FIG. 8 is a drawing showing an example of a determination routine of Step S1 of FIG. 7.

FIG. 8 is a drawing showing an example of a determination routine of Step S1 in FIG. 7. The flow chart of FIG. 8 is executed as a result of executing Step S1 of FIG. 7. First, the control means 51 determines whether or not abnormality avoidance measures are in progress (Step S11). Abnormality avoidance measures refer to specific measures for avoiding abnormalities in the fuel cell stack 10. In the case abnormality avoidance measures are determined to be in progress in Step S11, the control means 51 determines that the data cannot be used (Step S12). Subsequently, the control means 51 ends execution of the flow chart.

In the case error avoidance measures have not been determined to be in progress in Step S11, the control means 51 determines the temperature of cooling water flowing through the fuel cell stack 10 is within a specified range (Step S13). In the case the temperature of the cooling water has not been determined to be within the specified range in Step S13, the control means 51 determines that the data cannot be used (Step S12). Subsequently the control means 51 ends execution of the flow chart.

In the case the temperature of the cooling water has been determined to be within the specified range in Step S13, the control means 51 determines whether or not acceleration or deceleration of cell voltage or generated current is excessive (within a specified range) (Step S14). In the case acceleration or deceleration has been determined to be excessive in Step S14, the control means 51 determines that the data cannot be used (Step S12). Subsequently, the control means 51 ends execution of the flow chart.

In the case acceleration or deceleration has not been determined to be excessive in Step S14, the control means 51 determines whether or not the pressure of reaction gas (in the fuel cell stack) is equal to or greater than a specified value (Step S15). In the case the pressure of the reaction gas has not been determined to be equal to or greater than a specified value in Step S15, the control means 51 determines that the data cannot be used (Step S12) In the case the pressure of the reaction gas has been determined to be equal to or greater than a specified pressure in Step S15, the control means 51 determines that the data can be used (Step S16). In other words, the control means 51 determines that an abnormality in the fuel cell stack 10 should be avoided. Subsequently, the control means 51 ends execution of the flow chart.

Figure 9:
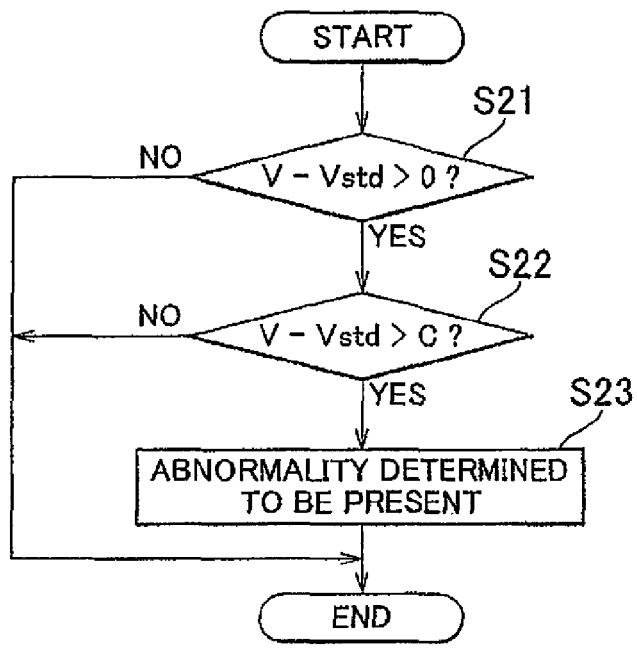
FIG. 9 is a drawing showing an example of a flow chart for detecting an inflection point.

When the data is determined to be able to be used in the flow chart of FIG. 8, the flow chart of FIG. 9 is executed. FIG. 9 is a drawing showing an example of a flow chart for detecting an infection point. The flow chart of FIG. 9 is executed by the determination means 52 at a prescribed cycle. More specifically, the flow chart of FIG. 9 is executed, for example, in the case current density has changed by a prescribed amount after a prescribed amount of time has elapsed. As shown in FIG. 9, the determination means 52 first determines whether the measured voltage V—standard voltage $V_{std}>0$ for a target cell group under the same current density conditions (Step S21). If measured voltage V—standard voltage $V_{std}$ has not been determined to be greater than 0 in Step S21, the determination means 52 ends execution of the flow chart.

In the case measured voltage V—standard voltage $V_{std}$ has been determined to be greater than 0 in Step S21, the determination means 52 determines whether or not measured voltage V—standard voltage $V_{std}>$offset valve C (Step S22). In the case measured voltage V—standard Voltage $V_{std}$ has not been determined to be greater than offset value C in Step S22 the determination means 52 ends execution of the flow chart. In the case measured voltage V—standard voltage $V_{std}$ has been determined to be greater than offset value C in Step S22 the determination means 52 determines there to be an abnormality in the target cell group (Step S23). Subsequently, the determination means 52 ends execution of the flow chart.

According to the flow chart of FIG. 9, an inflection point can be detected for a target cell group. Consequently, whether or not an abnormality has occurred in any cell of the target cell group can be accurately determined. In this case, decreases in power generation performance of the fuel cell stack 10 can be inhibited by switching operating conditions and the like. In addition, decreases in power generation performance of the fuel cell stack 10 can also be inhibited by replacing components of the target cell group. Moreover, since an inflection point can also be detected even if a plurality of cells are contained in a cell group, it is not necessary to provide voltage detection means for each cell. As a result, costs can be reduced.

Furthermore, although an infection point of a cell group was detected in the above-mentioned embodiment in the case measured voltage V—standard voltage $V_{std}>0$ or measured voltage V—standard voltage $V_{std}>0$ and measured voltage V—standard voltage $V_{std}>C$, inflection point detection is not limited thereto. For example, an inflection point may also be detected to be present for a cell group in the case the variance of measured voltage V from the standard voltage $V_{std}$ is equal to or greater than a prescribed value.

[First Variation]

Figure 10:
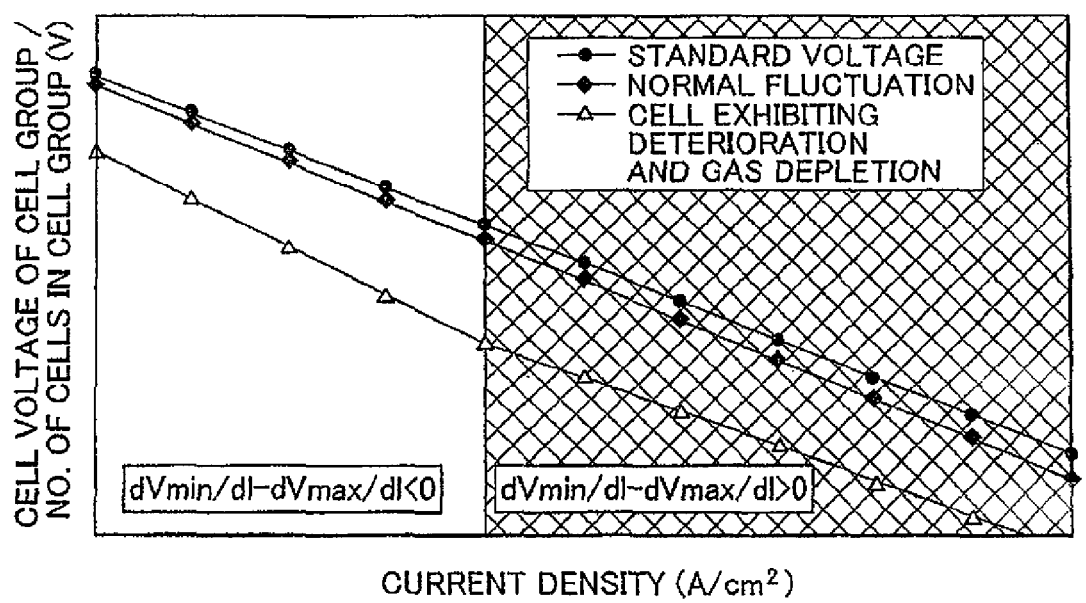
FIG. 10 is a graph for explaining detection of an inflection point using the relationship between current density and a standard voltage of a standard cell group.

Furthermore, an inflection point may also be detected by using the cell voltage of a standard cell group as a standard voltage, and using the relationship with this standard voltage to detect an infection point. FIG. 10 is a graph for explaining detection of an inflection point using the relationship with a standard voltage. In FIG. 10, current density is plotted on the horizontal axis and voltage per cell of each cell group is plotted on the vertical axis.

The cell voltage of a cell group having comparatively high power generation performance is preferably used for the standard voltage. For example, the value of a cell group having the maximum cell voltage may be used for the standard voltage, or the value of a cell group having a cell voltage equal to or greater than the average cell voltage of each cell group may be used for the standard voltage. In addition, the value of a cell group having a number of cells fewer than that of the other cell groups (such as the cell group having the fewest number of cells) may be used for the standard voltage. Moreover, the value of the cell group having the high durability may be used for the standard voltage. Here, a cell group having the high durability refers to the cell group that is resistant to deterioration. For example, a cell group provided with a catalyst layer containing highly crystalline carbon, or a cell group provided with a catalyst layer supporting platinum having a large particle diameter can be used as a cell group having high durability. In addition, the cell voltage of a cell group that has been measured in advance may also be used. Furthermore, the voltage value resulting from excluding a prescribed amount each of the upper and lower ends (for example, about 5% each) of the range of current density capable of being output by the cells 11 may also be used as a standard voltage. In this modified example, the cell voltage $V_{max}$ of the cell group demonstrating the highest cell voltage is used for the standard voltage as an example thereof. In addition, the cell group demonstrating the lowest cell voltage $V_{min}$ is used for the target cell group.

As shown in FIG. 10, the voltage $V_{max}$ used for the standard voltage decreases linearly as current density increases. In addition, cell groups demonstrating fluctuations in reaction gas within the normal range indicate a voltage close to the standard voltage. In comparison therewith, in cell groups in which the reaction gas has been depleted, cell voltage decreases in comparison with the standard voltage and an inflection point appears.

In this modified example, the slope of the standard voltage relative to the current density is sued to detect an inflection point. When the current density is lower than the current density at the inflection point, $dV_{min}/dI-dV_{max}/dI<0$. In contrast, on the side of high current density beyond the inflection point, $dV_{min}/dI-dV_{max}/dI>0$. Thus, the presence or absence of an inflection point can be determined by determining whether or not $dV_{min}/dI-dV_{max}/dI$ changes from a positive value to a negative value. In consideration of measurement error and the like, an inflection point may be determined to be present in the case $dV_{min}/dI-dV_{max}/dI>E$ (offset value).

Figure 11:
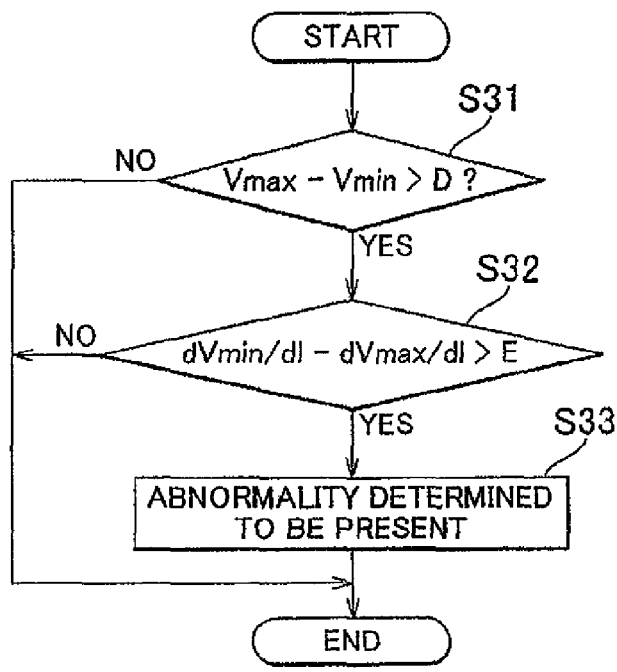
FIG. 11 is a drawing showing an example of a flow chart for detecting an inflection point.

FIG. 11 is a drawing showing an example of a flow chart for detecting an inflection point. The flow chart of FIG. 11 is executed by the determination means 52 at a prescribed cycle. More specifically, the flow chart of FIG. 11 is executed in the case, for example, a prescribed amount of time has elapsed or in the case current density has changed by a prescribed amount. As shown in FIG. 11, the determination means 52 determines whether or not $V_{max}-V_{min}>D$ under the same current density conditions (Step S31). By providing a prescribed threshold value for the difference between $V_{max}$ and $V_{min}$ in this manner, the cell group for which an inflection point is present can be accurately detected. In the case $V_{max}-V_{min}$ has not been determined to be greater than D in Step S31, the determination means 52 ends execution of the flow chart.

In the case $V_{max}-V_{min}$ has been determined to be greater than D in Step S31, the determination means 52 determines whether $dV_{min}/dI-dV_{max}/dI>$offset value E (Step S32). By providing an offset value in this manner, incorrect determinations caused by measurement error and the like can be avoided. In the case $dV_{min}/dI-d_{max}/dI$ has not been determined to be greater than offset value E in Step S32, the determination means 52 ends execution of the flow chart. In the case $dV_{min}/dI-dV_{max}/dI$ has been determined to be greater than the offset value E in Step S32, the determination means 52 determines that an abnormality has occurred in the target cell group (Step S33). Subsequently, the determination means 52 ends execution of the flow chart.

According to the flow chart of FIG. 11, an inflection point can be detected for a target cell group. Consequently, whether or not an abnormality has occurred in any cell of the target cell group can be determined with high accuracy. Moreover, since an inflection point can be detected even if a plurality of cells are contained in a cell group, it is not necessary to provide voltage detection means for each cell. As a result, costs can be reduced.

[Second Variation]

Figure 12:
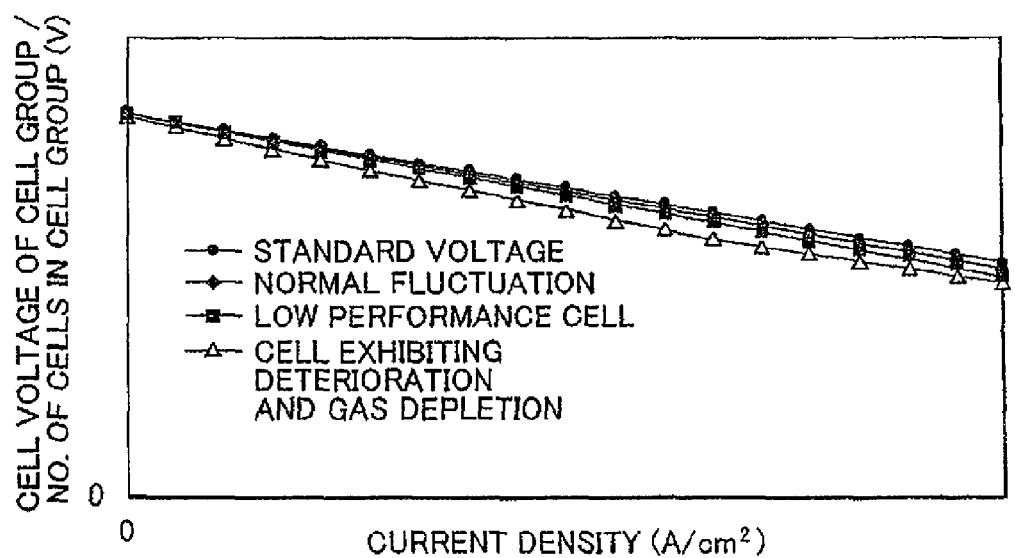
FIG. 12 is a graph showing the case in which 10 cells are contained in each cell group.

Here, it becomes increasingly difficult to detect an inflection point the greater the number of the cells 11 contained in each cell group. FIG. 12 indicates an example of 10 of the cells 11 being contained in each cell group. In FIG. 12, current density is plotted on the horizontal axis and the value obtained by dividing the cell voltage of each cell group by the number of cells contained in each cell group is plotted on the vertical axis. As shown in FIG. 12, the difference between the standard voltage of a standard cell group and the cell voltage of a cell group in which a problem has occurred becomes smaller. Thus, it becomes difficult to detect an inflection point.

Therefore, in this modified example, an inflection point is detected using the rate of divergence of the generated voltage of a target cell group from the standard voltage. Here, rate of divergence can be defined as shown in the following formula (4). Furthermore, in the following formula (4), voltage values are used under the same current density conditions.

Rate of divergence=(standard voltage−generated voltage of target cell group)/standard voltage×100%   (4)

Figure 13:
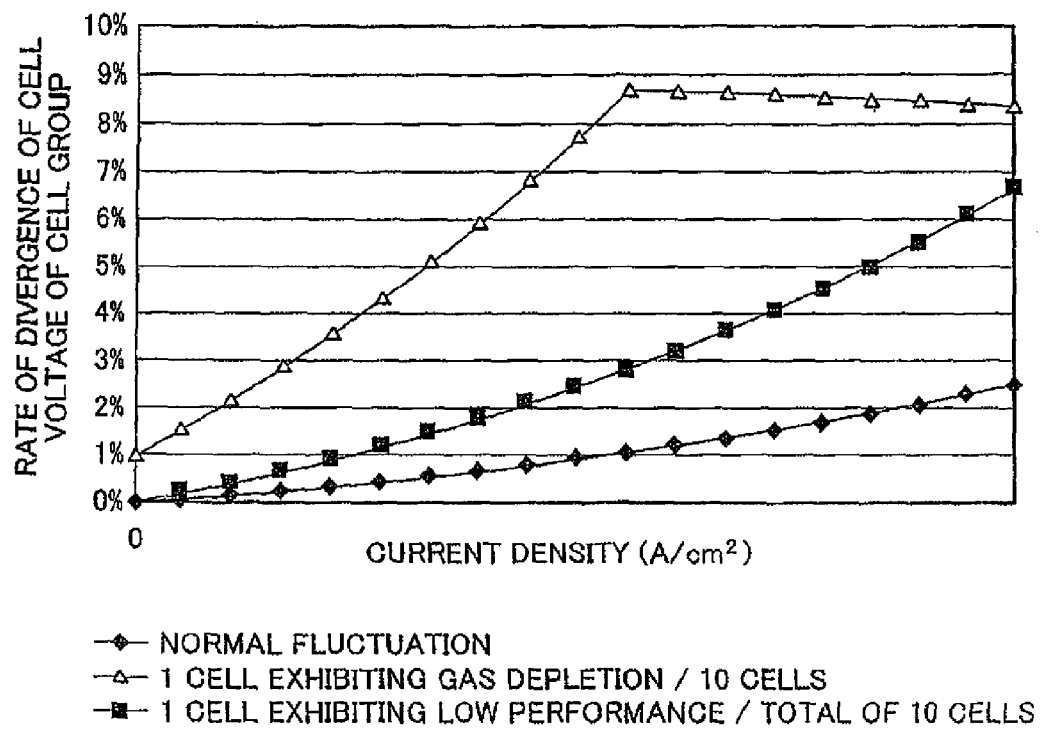
FIG. 13 is a graph showing the relationship between current density and rate of divergence.

FIG. 13 is a graph showing the relationship between current density and rate of divergence. In FIG. 13, current density is plotted on the horizontal axis and rate of divergence is plotted on the vertical axis. As shown in FIG. 13, in the case reaction gas fluctuates within the normal range, rate of divergence increases with increases in current density. In comparison therewith, in a cell group in which reaction gas has been depleted, rate of divergence increases with increases in current density and then begins to decrease starting at a prescribed value. That value is detected as an inflection point.

Figure 14A:
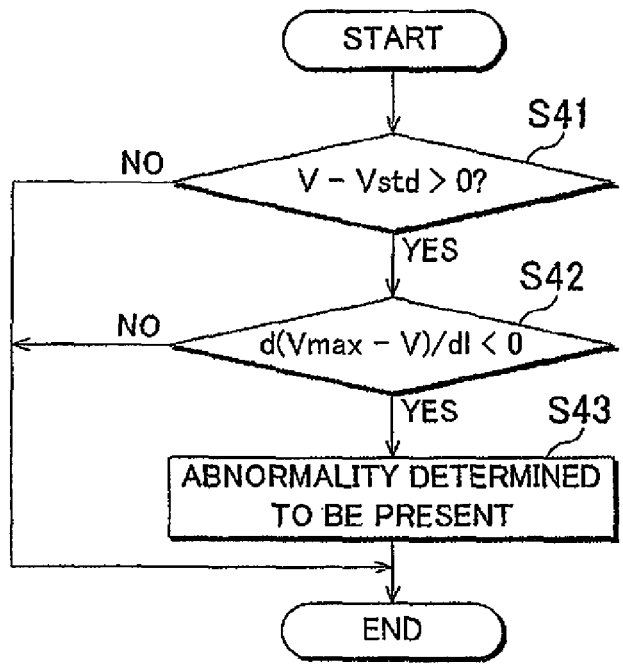
FIGS. 14A and 14B are drawings showing examples of flow charts for detecting an inflection point.
Figure 14B:
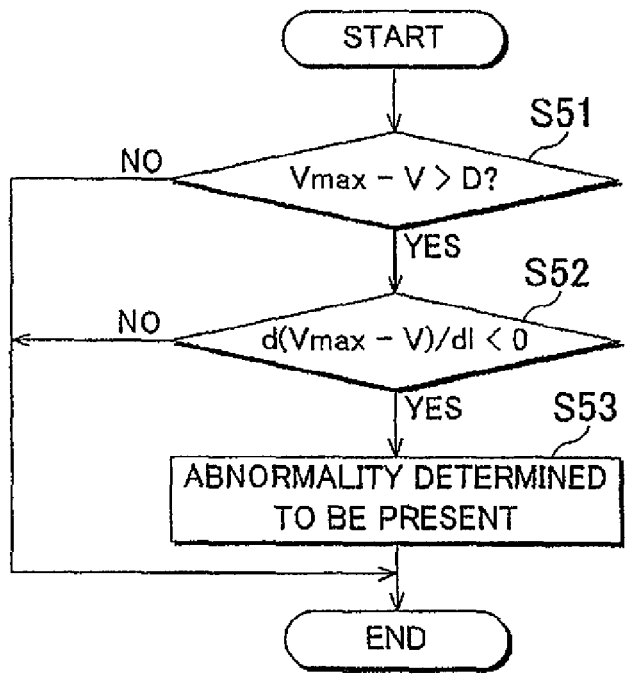
Figure 15:
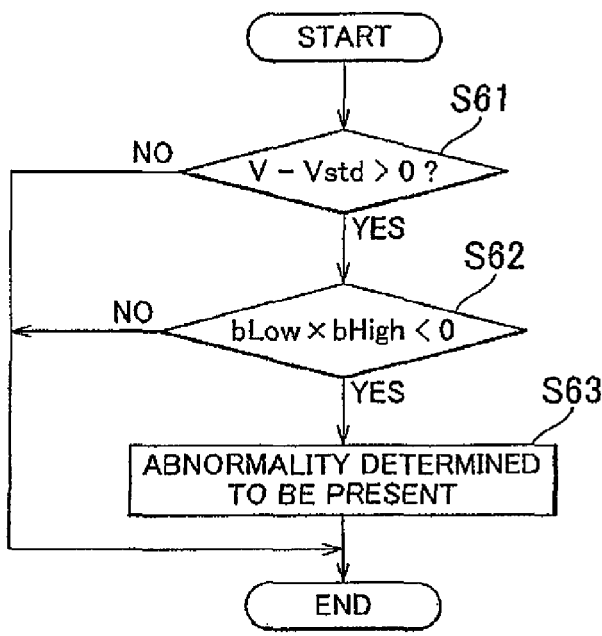
FIG. 15 is a drawing showing an example of a flow chart for detecting an inflection point.

FIGS. 14A, 14B and 15 are drawings showing examples of flow charts for detecting an inflection point. The flow charts of FIGS. 14A, 14B and 15 are executed by the determination means 52 at a prescribed cycle. More specifically, the flow charts of FIGS. 14A, 14B and 15 are executed in the case, for example, a prescribed amount of time has elapsed or in the case current density has changed by a prescribed amount. As shown in FIG. 14A, the determination means 52 determines whether measured voltage V—standard voltage $V_{std}>0$ under the same current density conditions (Step S41) in the same manner as Step S21 of FIG. 9. In the case measured voltage V—standard voltage $V_{std}$ has not been determined to be greater than 0 in Step S41, the determination means 52 ends execution of the flow chart.

In the case measured voltage V—standard voltage $V_{std}$ has been determined to be greater than 0 in Step S41, the determination means 52 determines whether the rate of divergence ($d(V_{max}-V)/dI$) has a negative slope relative to an increase in current density (Step S42). In the case the rate of divergence has not been determined to have a negative slope in Step S42, the determination unit 52 ends execution of the flow chart. In the case the rate of divergence has been determined to have a negative slope in Step S42, the determination means 52 determines that an abnormality has occurred in any of the cells 11 of the target cell group (Step S43). Subsequently, the determination means 52 ends execution of the flow chart.

In addition, as shown in FIG. 14B, the determination means 52 may also determine whether $V_{max}-V>D$ in the same manner as Step S31 of FIG. 11 instead of Step S41 in FIG. 14A (Step S51).

In addition, as shown in FIG. 15, the determination means 52 may execute Step S62 instead of Step S42 of FIG. 14A. In Step S62, the determination means 52 determines whether or not the product of a slope $b_{Low}$ of the rate of divergence relative to the current density in a low current density region of the target cell group and a slope $b_{High}$ of the rate of divergence relative to the current density in a high current density region of the target cell group is negative. In this case, in the case an inflection point appears, either or slope $b_{Low}$ or slope $b_{High}$ is a positive value and the other is a negative value. Thus, in the case of the appearance of an inflection point, $b_{Low} \times b_{High} < 0$. Furthermore, the above-mentioned low current density region and high current density region can be reset as necessary.

According to the flow charts of FIGS. 14A, 14B and 15, an inflection point can be detected using the rate of divergence of a target cell group. Consequently, whether or not an abnormality has occurred in the target cell group can be determined with high accuracy. Moreover, since an inflection point can be detected even if a plurality of cells are contained in the cell group, it is not necessary to provide voltage detection means for each cell. As a result, costs can be reduced.

[Third Variation]

Figure 16:
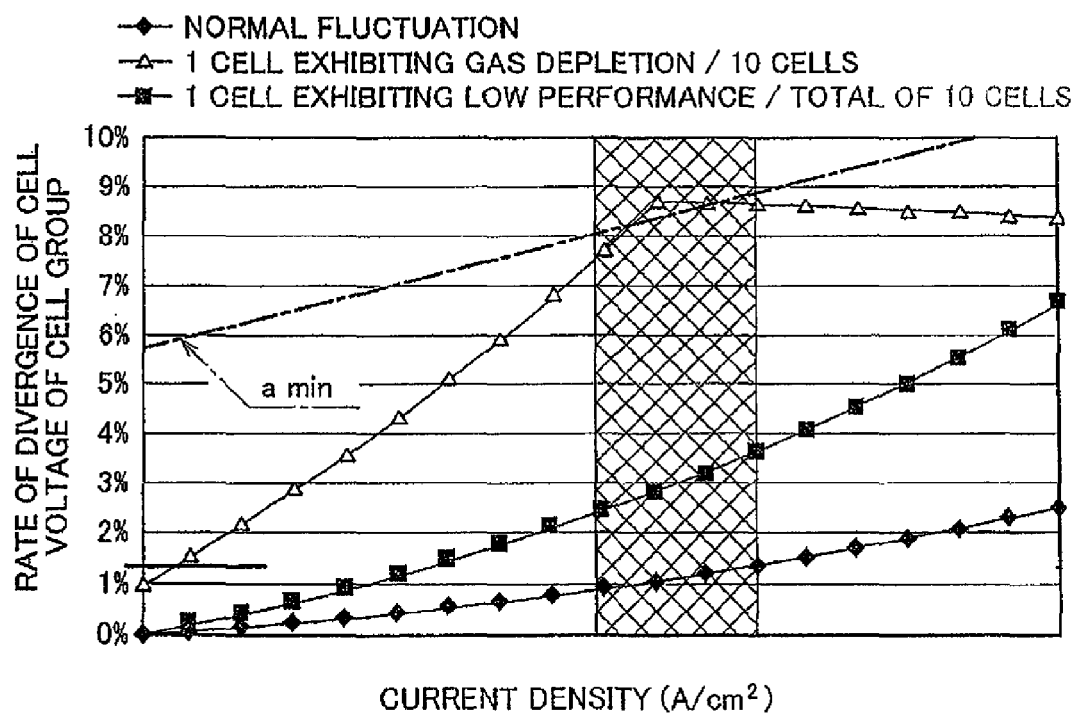
FIG. 16 is a drawing for explaining primary regression of a rate of divergence.

The presence or absence of an inflection point may also be determined based on an intercept of a primary regression line of the rate of divergence of a target cell group. As explained in FIG. 13, when an inflection point is present, the slope of the rate of divergence relative to the current density changes from positive to negative. Thus, when an inflection point is present, the intercept of the primary regression line of the rate of divergence becomes larger as shown in FIG. 16. The inflection point can then be determined to be present in the case this intercept is equal to or greater than a prescribed value.

Figure 17:
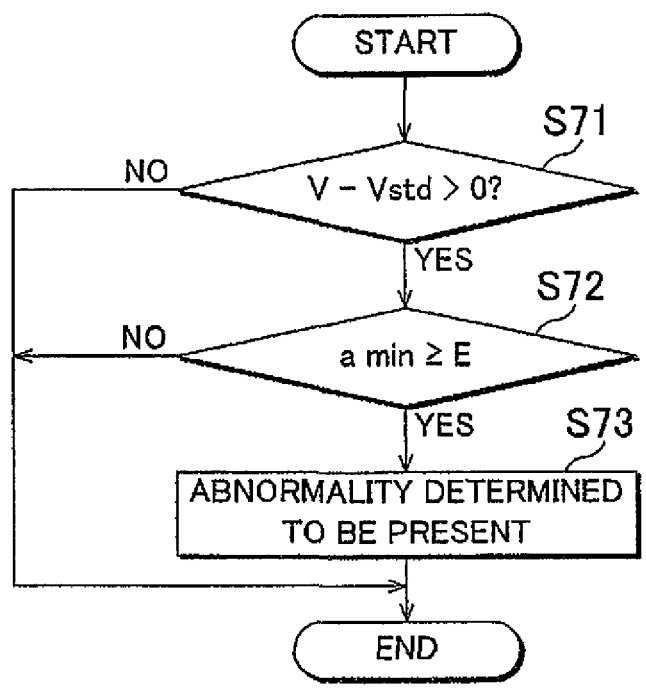
FIG. 17 is a drawing showing an example of a flow chart for detecting an inflection point.

FIG. 17 is a drawing showing an example of a flow chart for detecting an inflection point. The flow chart of FIG. 17 is executed by the determination means 52 at a prescribed cycle. More specifically, the flow chart of FIG. 17 is executed in the case, for example, a prescribed amount of time has elapsed or current density has changed by a prescribed amount. As shown in FIG. 17, the determination means 52 first determines whether or not measured voltage V—standard voltage $V_{std} > 0$ in the same manner as Step S21 of FIG. 9 (Step S71). In the case measured voltage V—standard voltage $V_{std}$ has not been determined to be greater than 0 in Step S71, the determination means 52 ends execution of the flow chart.

In the case measured voltage V—standard voltage $V_{std}$ has been determined to be greater than 0 in Step S71, the determination unit 52 determines whether or not an intercept $a_{min}$ of a primary regression equation of the rate of divergence of a target cell group is equal to or greater than a threshold value E (Step S72). In the case the intercept a has not been determined to be equal to or greater than the threshold value E in Step S72, the determination means 52 ends execution of the flow chart. In the case the intercept $a_{min}$ has been determined to be equal to or greater than the threshold value E in Step S72, the determination means 52 determines that an abnormality has occurred in any of the cells 11 of the target cell group (Step S73). Subsequently, the determination means 52 ends execution of the flow chart.

According to the flow chart of FIG. 17, an inflection point can be detected using the rate of divergence of a target cell group. Consequently, whether or not an abnormality has occurred in the target cell group can be detected with high accuracy. Moreover, since an inflection point can be detected even if a plurality of cells are contained in the cell group, it is not necessary to provide voltage detection means for each cell. As a result, costs can be reduced.

In the above-embodiment and the modified examples, the fuel cell stack includes at least one of cell group that includes a plurality of cells.

The invention claimed is:

1. A fuel cell system comprising:
a voltage detection device configured to detect a cell voltage of a cell group containing a plurality of cells;
a current density detection device configured to detect a generated current density of the cell group and to obtain a generated current density of the cell group by dividing the detected generated current by a surface area of a power generation region of each cell in the cell group; and
an electronic control unit including a determination portion,
wherein the determination portion is configured to determine a presence or absence of an inflection point of a change in the cell voltage relative to the generated current density based on detection results of the voltage detection device and the current density detection device,
wherein the determination portion is configured to determine that there is a cell abnormality caused by depletion of reaction gas when the presence of the inflection point is determined,
wherein the determination portion is configured to determine whether a difference between a primary regression voltage of the cell voltage of the cell group and the cell voltage detected by the voltage detection device under prescribed conditions is greater than 0, and
wherein the determination portion is configured to determine, when the difference is greater than 0, that the inflection point is at a lower current density side with respect to a current density at which the difference is determined as greater than 0,
the electronic control unit further including a control portion configured to control supply of a fuel gas and an oxidant gas to the cell group according to a result of the determination portion determining the presence of a cell abnormality.

2. The fuel cell system according to claim 1, wherein a standard cell group has higher power generation performance than an average power generation performance of all cell groups in a fuel cell stack.

3. The fuel cell system according to claim 2, wherein the standard cell group is a cell group having a highest voltage among the cell groups in the fuel cell.

4. The fuel cell system according to claim 2, wherein the standard cell group is a cell group having a fewest number of cells among the cell groups in the fuel cell.

5. The fuel cell system according to claim 1, wherein a standard cell group has higher power generation durability than an average power generation durability of all cell groups in a fuel cell stack.

6. The fuel cell system according to claim 1, wherein a cell group which is compared with a standard cell group is a cell group having a lowest voltage in a fuel cell stack.

7. The fuel cell system according to claim 1, wherein a prescribed offset value C is provided, and when the difference is greater than 0, the determination portion determines that an abnormality exists when the difference is determined to be greater than the prescribed offset value C.

8. The fuel cell system according to claim 1, wherein the primary regression voltage is calculated by the following formulas:

$$b = (\Sigma(I_i - I_{ave})(V_i - V_{ave}))/(\Sigma(I_i - I_{ave})^2) \qquad (1)$$

$$a = V_{ave} - b \times I_{ave} \quad (2)$$

$$V_{std} = a + b \times I \quad (3)$$

wherein, $I_i$ indicates a current density, $I_{ave}$ indicates the average current density, $V_i$ indicates a voltage per cell, $V_{ave}$ indicates the average voltage, b indicates a regression coefficient, a is a regression equation intercept and $V_{std}$ is the primary regression voltage.

9. A method for detecting the status of a fuel cell, comprising:
- a voltage detection step of detecting a cell voltage of a cell group containing a plurality of cells;
- a current density detection step of detecting a generated current of the cell group and obtaining a generated current density of the cell group by dividing the detected generated current by a surface area of a power generation region of each cell in the cell group; and
- a determination step of determining a presence or absence of an inflection point of a change in the cell voltage relative to the generated current density based on detection results in the voltage detection step and the current density detection step,
- determining that there is cell abnormality caused by depletion of reaction gas when the presence of the inflection point is determined,
- determining whether a difference is greater than 0 between a primary regression voltage of the cell voltage of the cell group and the detected voltage under prescribed conditions, and
- wherein, when the difference is greater than 0, determining the inflection point exists at a lower current density side with respect to a current density at which the difference is determined as greater than 0,
- controlling supply of a fuel gas and an oxidant gas to the cell according to a result of whether a cell abnormality is determined.

10. The status detection method according to claim 9, wherein
the standard cell group has higher power generation performance than an average power generation performance of all cell groups in a fuel cell stack.

11. The status detection method according to claim 9, wherein
the standard cell group has higher power generation durability than an average power generation durability of all cell groups in a fuel cell stack.

* * * * *